(12) United States Patent
Rock et al.

(10) Patent No.: US 11,840,054 B2
(45) Date of Patent: *Dec. 12, 2023

(54) COMPOSITE TEXTILE FABRICS

(71) Applicant: MMI-IPCO, LLC., Spartanburg, SC (US)

(72) Inventors: Moshe Rock, Brookline, MA (US); William K. Lie, Methuen, MA (US); Edward P. Dionne, Oxford, ME (US); James Zeiba, Derry, NH (US); David Costello, Marblehead, MA (US); Jane Hunter, Manassas, VA (US); Gadalia Vainer, Melrose, MA (US); Marcus Webster, Pelham, NH (US)

(73) Assignee: MMI-IPCO, LLC, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,521

(22) Filed: Dec. 8, 2021

(65) Prior Publication Data
US 2022/0097340 A1    Mar. 31, 2022

Related U.S. Application Data

(60) Continuation of application No. 15/957,290, filed on Apr. 19, 2018, now Pat. No. 11,338,547, which is a
(Continued)

(51) Int. Cl.
B32B 5/26 (2006.01)
B32B 7/05 (2019.01)
(Continued)

(52) U.S. Cl.
CPC .......... B32B 5/26 (2013.01); B32B 3/28 (2013.01); B32B 5/026 (2013.01); B32B 5/06 (2013.01); B32B 5/08 (2013.01); B32B 7/02 (2013.01); B32B 7/028 (2019.01); B32B 7/05 (2019.01); B32B 25/14 (2013.01); B32B 37/144 (2013.01); D04B 1/12 (2013.01); D04B 1/24 (2013.01); D04B 1/246 (2013.01); B32B 2250/02 (2013.01); B32B 2250/20 (2013.01); B32B 2262/02 (2013.01); B32B 2262/0207 (2013.01);
(Continued)

(58) Field of Classification Search
None
See application file for complete search history.

(56) References Cited

U.S. PATENT DOCUMENTS 3,479,844 A    11/1969  Silvain
3,971,234 A    7/1976   Taylor
(Continued)

OTHER PUBLICATIONS

International Search Report and Written Opinion; PCT/US11/20774; Lee W. Young; dated Mar. 23, 2011.

*Primary Examiner* — Shawn Mckinnon
(74) *Attorney, Agent, or Firm* — Cheryl J. Brickey

(57) ABSTRACT

A composite textile fabric that includes a first (face) fabric layer, and a second (back) fabric layer that is formed concurrently with the first fabric layer in a plaited construction. The second fabric includes a plurality of anchored regions at which the second fabric layer is anchored to, and in intimate contact with, the first fabric layer. The second fabric layer also includes a plurality of floating regions, overlying and unattached to the first fabric layer, interspersed between the anchored regions.

14 Claims, 8 Drawing Sheets

Related U.S. Application Data division of application No. 13/009,324, filed on Jan. 19, 2011, now abandoned.

(60) Provisional application No. 61/296,103, filed on Jan. 19, 2010.

(51) Int. Cl.
| | |
|---|---|
| *B32B 25/14* | (2006.01) |
| *B32B 37/14* | (2006.01) |
| *B32B 5/02* | (2006.01) |
| *B32B 5/06* | (2006.01) |
| *B32B 5/08* | (2006.01) |
| *B32B 7/02* | (2019.01) |
| *B32B 3/28* | (2006.01) |
| *D04B 1/12* | (2006.01) |
| *D04B 1/24* | (2006.01) |
| *B32B 7/028* | (2019.01) |

(52) U.S. Cl.
CPC ............... *B32B 2262/0215* (2013.01); *B32B 2262/0261* (2013.01); *B32B 2262/0276* (2013.01); *B32B 2262/04* (2013.01); *B32B 2262/06* (2013.01); *B32B 2262/08* (2013.01); *B32B 2305/18* (2013.01); *B32B 2307/304* (2013.01); *B32B 2307/3065* (2013.01); *B32B 2307/724* (2013.01); *B32B 2307/736* (2013.01); *B32B 2437/00* (2013.01); *D10B 2401/04* (2013.01); *D10B 2401/061* (2013.01); *D10B 2403/0114* (2013.01); *D10B 2403/0231* (2013.01); *Y10T 428/24562* (2015.01)

(56) References Cited

U.S. PATENT DOCUMENTS

| | | | |
|---|---|---|---|
| 4,199,633 | A | 4/1980 | Blore |
| 4,771,614 | A | 9/1988 | Kemp |
| 7,217,456 | B1 | 5/2007 | Rock |
| 7,396,784 | B2 | 7/2008 | Thiriot |
| 7,428,772 | B2 | 9/2008 | Rock |
| 2003/0077967 | A1 | 4/2003 | Rock |
| 2007/0089800 | A1 | 4/2007 | Sharma |
| 2008/0189824 | A1 | 8/2008 | Rock |
| 2009/0260124 | A1 | 10/2009 | Yasui |
| 2010/0058812 | A1 | 3/2010 | Schulein |

KNIT □   TUCK ●   FLOAT —

DIAL CAMS

FEED #1 KNIT ALL
FEED #2 WELT ALL

REPEAT

FACTORS:
  16 RPM-26-27;
  18 RPM-30.00;
  19 RPM-31.67;
  21 RPM-35.00;
  22 RPM-36.67;
  24 RPM-40.00;
  28 RPM-46.67;
  30 RPM-50.00;
  31 RPM-51.67;
  47 RPM-78.33;
  50 RPM-83.33;
  57 RPM-95.00;
  60 RPM-100.0

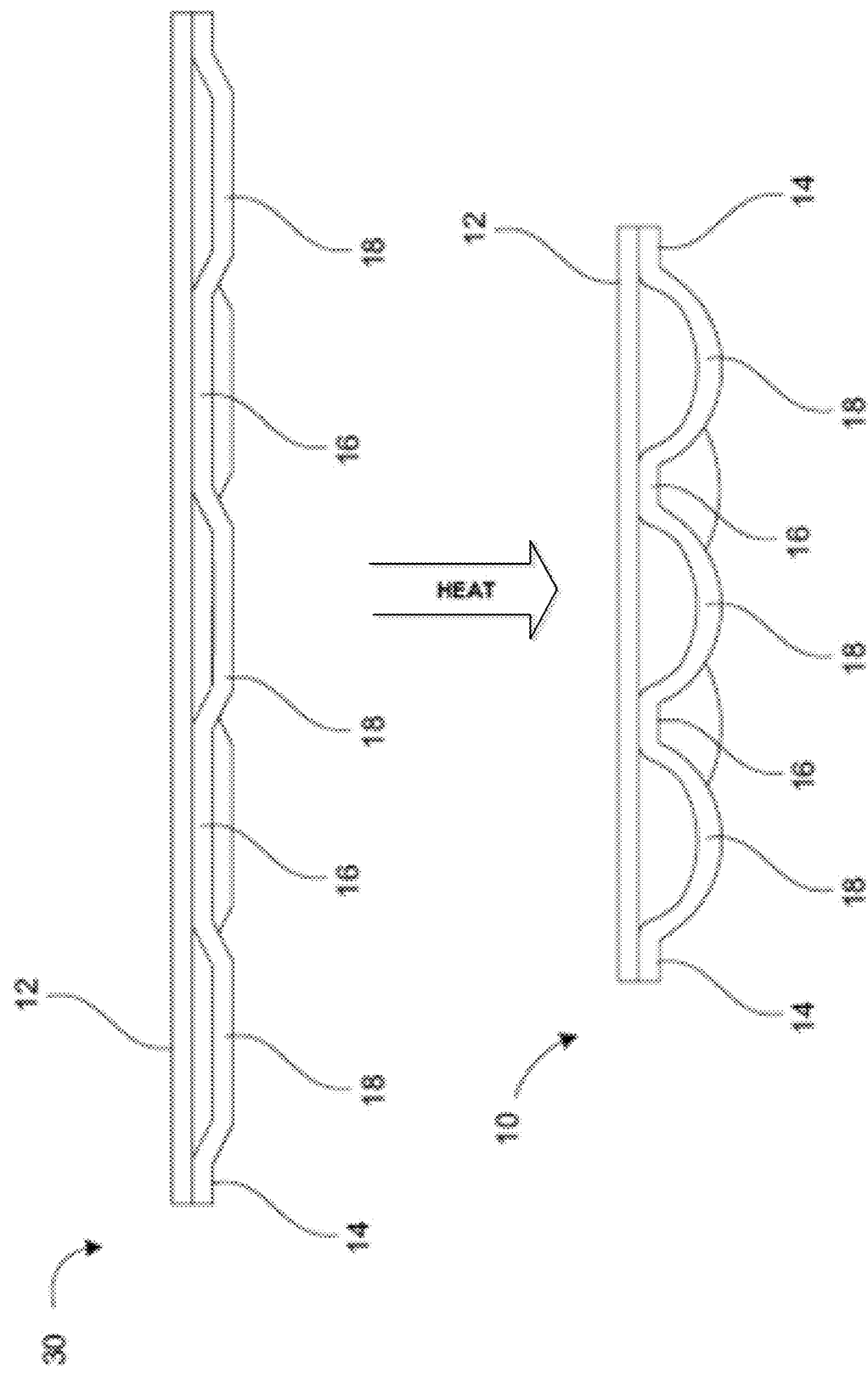

COMPOSITE TEXTILE FABRICS

CROSS-REFERENCE TO RELATED APPLICATIONS

This application is a continuation of U.S. patent application Ser. No. 15/957,290, filed on Apr. 19, 2018, which was a divisional application of U.S. patent application Ser. No. 13/009,324, filed on Jan. 19, 2011, which claims benefit from U.S. Provisional Patent Application 61/296,103, filed Jan. 19, 2010, all of which are herein incorporated by reference in their entirety.

TECHNICAL FIELD

This invention relates to composite textile fabrics and related fabric articles and methods.

BACKGROUND

Composite textile fabrics are achieved by joining together different materials in a fabric body for the purpose of attaining desirable properties that cannot be attained by the individual materials alone.

One known composite textile fabric, which is utilized in fabric garments, features a bi-component plaited knit construction that uses different yarns on either side of the fabric. This creates two different fabric layers: a first fabric layer that is worn towards the skin and is constructed to move moisture away from the skin, and a second, opposite fabric layer that is optimized to dry quickly. In high exertion physical activity, however, the first fabric layer can have a tendency to stick to the skin (clinging), which may reduce air flow and sweat evaporation. This can cause a chilling effect after the physical activity has stopped.

SUMMARY

In general, this invention relates to composite textile fabrics and related fabric articles (e.g., garments) and methods.

One aspect of the invention provides a composite textile fabric that includes a first (face) fabric layer, and a second (back) fabric layer that is formed concurrently with the first fabric layer in a plaited construction. The second fabric layer includes a plurality of anchored regions at which the second fabric layer is anchored to, and in intimate contact with, the first fabric layer. The second fabric layer also includes a plurality of floating regions, overlying and unattached to the first fabric layer, interspersed between the anchored regions.

Another aspect of the invention features a method of forming a composite fabric article. The method includes combining high shrinkage yarn and low shrinkage or no shrinkage yarn to form a fabric body having a plaited construction. The high shrinkage yarn forms a first fabric layer of the fabric body and the low shrinkage or no shrinkage yarn forms a second fabric layer of the fabric body. The second fabric layer includes a plurality of anchored regions at which the second fabric layer is anchored to, and in intimate contact with, the first fabric layer, and a plurality of floating regions, overlying and unattached to the first fabric layer, interspersed between the anchored regions. The method also includes exposing the fabric body to heating sufficient to cause the first fabric layer to shrink relative to the second fabric layer such that the floating regions separate (buckle outwardly) from the first fabric layer.

In another aspect, the invention provides a fabric garment that includes (e.g., is formed of) a composite textile fabric including a first (face) fabric layer and a second (back) fabric layer formed concurrently with the first fabric layer in a plaited construction. The second fabric layer includes a plurality of anchored regions at which the second fabric layer is anchored to, and in intimate contact with, the first fabric layer, and a plurality of floating regions, overlying and unattached to the first fabric layer, interspersed between the anchored regions. The second fabric layer defines an inner surface of the fabric garment. The plurality of floating regions together with the plurality of anchored regions defining air gaps between a wearer's skin and the first fabric layer, thereby to facilitate ventilation and reduce contact points with the wearer's skin, or to provide thermal insulation such as when the fabric garment is utilized as a first layer in a multilayer fabric system.

Embodiments may include one or more of the following features.

In some embodiments, the fabric has a plaited single jersey construction or a double knit construction.

In certain embodiments, the first fabric layer includes a high shrinkage yarn, and the second fabric layer includes a low shrinkage or no shrinkage yarn.

The high shrinkage yarn responds to application of heat (e.g., dry heat and/or wet heat, such as hot water or steam, e.g., during dyeing).

In some embodiments, the high shrinkage yarn includes an elastomeric material (e.g., Lycra, spandex).

In certain embodiments, the high shrinkage yarn is a textured yarn or a spun yarn.

In some embodiments, the low shrinkage or no shrinkage yarn is a textured filament yarn, or flat filament yarn, or a spun yarn.

The high shrinkage yarn is finer (i.e., has finer denier) than the low shrinkage or no shrinkage yarn.

In some cases, the low shrinkage or no shrinkage yarn is finer than the high shrinkage yarn.

In some embodiments, the high shrinkage yarn and the low shrinkage or no shrinkage yarn have the same fineness.

In some cases, the high shrinkage yarn is in a size range of about 50 denier to about 150 denier, and wherein the low shrinkage or no shrinkage yarn is in a size range of about 50 denier to about 300 denier.

In certain embodiments, yarn forming the first fabric layer is finer than yarn forming the second fabric layer.

In some cases, yarn forming the second fabric layer is finer than yarn forming the first fabric layer.

In certain embodiments, yarn forming the second fabric layer and yarn forming the first fabric layer have substantially the same fineness.

In some cases, yarn forming the first fabric layer is in a size range of about 50 denier to about 150 denier, and yarn forming the second fabric layer is in a size range of about 50 denier to about 300 denier.

Methods can include exposing the fabric body to dry heat and/or to wet heat, such as hot water or steam, e.g., during dyeing.

Methods can also include exposing the fabric body to heating for about 0.5 minutes to about 60 minutes at about 200° F. to about 450° F.

In some embodiments, the plurality of anchored regions and the plurality of floating regions are arranged in one or more discrete regions of the second fabric layer, and the second fabric layer also includes one or more other discrete regions having a plain plaited construction.

In certain embodiments, the plurality of floating regions are arranged in a pattern corresponding to one or more discrete regions of the wearer's body.

In some embodiments, the plain plaited construction has a jacquard pattern.

In certain embodiments, the plurality of floating regions include floating regions of contrasting size.

In some embodiments, the plurality of floating regions are arranged in patterns of contrasting density.

In certain embodiments, the plurality of floating regions can be arranged to form contrasting patterns.

In some embodiments, the plurality of floating regions can have differing sizes.

In certain embodiments, the first fabric layer includes elastomeric yarn (e.g., spandex yarn). The second fabric layer may include a low stretch or no stretch yarn.

In some embodiments, the first fabric layer and/or the second fabric layer include flame retardant yarns and/or fibers.

Other aspects, features, and advantages are in the description, drawings, and claims.

DESCRIPTION OF DRAWINGS

FIG. 4 illustrates a fabric body of a composite textile fabric before and after exposure to heat.

Like reference symbols in the various drawings indicate like elements.

DETAILED DESCRIPTION

Figure 1:
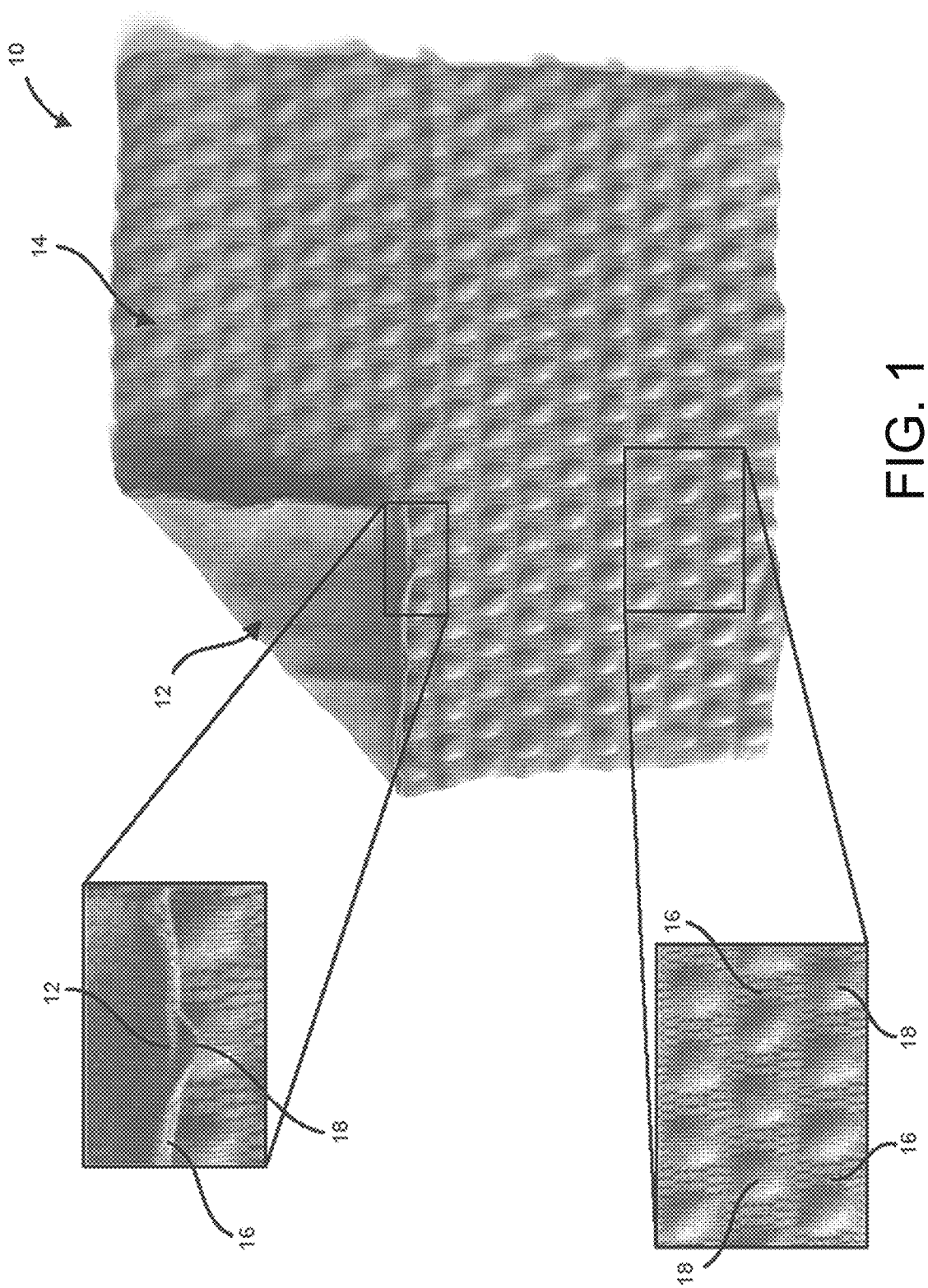
FIG. 1 is a plan view of a composite textile fabric.

Referring to FIG. 1, a composite textile fabric 10 includes a first fabric layer 12 and a second fabric layer 14 that are intimately connected together. The second fabric layer 14 includes a plurality of anchored regions 16 at which the second fabric layer 14 is anchored to the first fabric layer 12. The second fabric layer 14 also includes a plurality of "bubbles" or floating regions 18, which are interspersed between the anchored regions 16. The floating regions 18 overlie and are separated (buckle outwardly) from the first fabric layer 12.

Figure 2A:
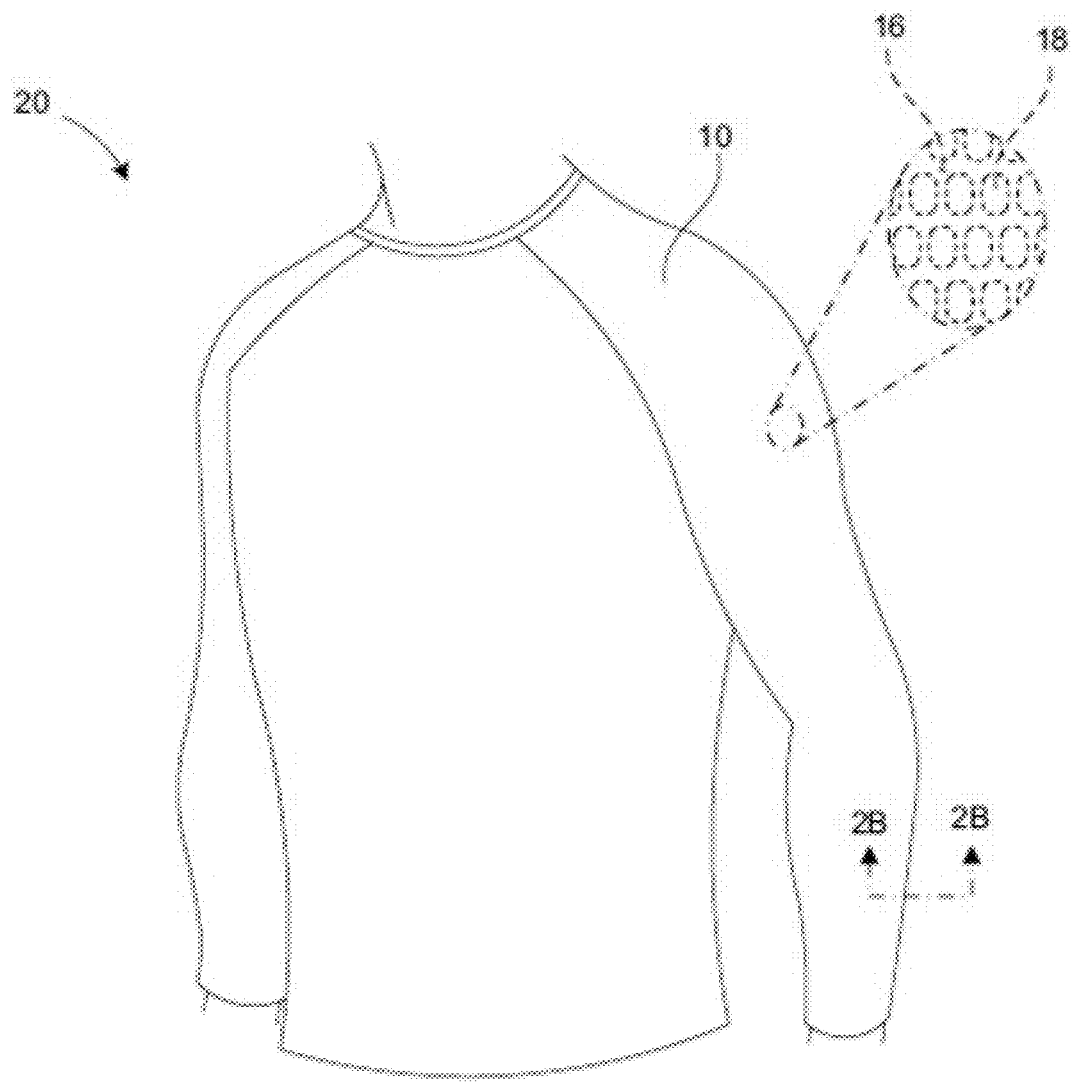
FIG. 2A is a front perspective view of a fabric garment formed of composite textile fabric.
Figure 2B:
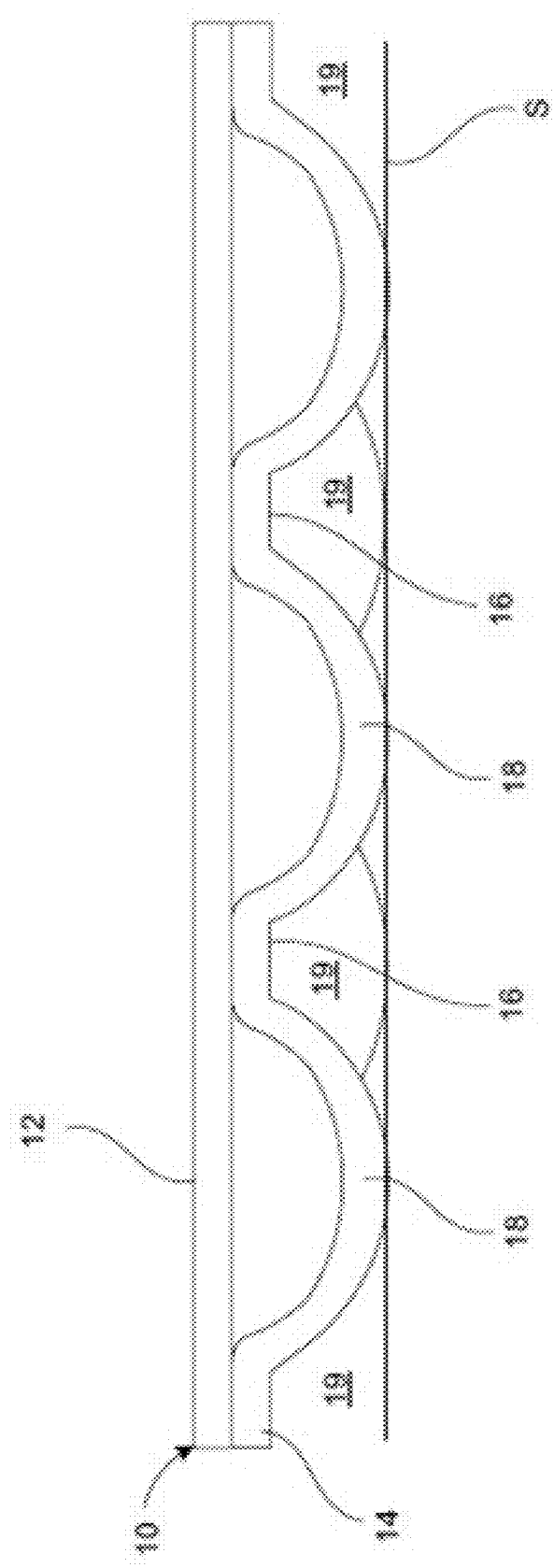
FIG. 2B is a cross-sectional view of the fabric garment of FIG. 2B, taken along line 2B-2B.

Referring to FIGS. 2A and 2B, the composite textile fabric 10 can be incorporated in a fabric garment 20 such that the second fabric layer 14 forms an inner surface of the fabric garment to be worn towards the wearer's skin S (FIG. 2B). When the second fabric layer 14 is worn towards the wearer's skin S, the plurality of floating regions 18 and the plurality of anchored regions 16 together define air gaps 19 between the wearer's skin S and the first fabric layer 14. These air gaps 19 allow air, flowing transversely to the wearer's skin, to penetrate the textile fabric 10 to promote evaporation of liquid sweat and reduce contact points with the wearer's skin S.

The fabric garment 20 (FIG. 2A) may also be form part of a multilayer system for cold weather. In this regard, the fabric garment 20 may, for example, be worn as a first, inner layer underneath an outer, shell layer. When incorporated in such a multilayer system, the fabric garment 20 provides for thermal insulation by entrapping air.

The first and second fabric layers 12, 14 are formed by knitting two different yarns having significantly different shrinkage performance when exposed to dry or wet heat (e.g., steam or high temperature water). The first fabric layer 12 is formed of a face yarn. The face yarn is a textured yarn or a spun yarn having high shrinkage (e.g., about 10-60% shrinkage) after being exposed to dry or wet heat (e.g., for about 0.5 minutes to about 60 minutes at about 200° F. to about 450° F.). The face yarn can include materials selected from natural fibers, regenerated fibers, synthetic fibers, or blends thereof. A suitable face yarn is polyester or nylon. The second fabric layer 14 is formed of a back yarn having low or no shrinkage (e.g., about 0-30% shrinkage) after being exposed to dry or wet heat (e.g., for about 0.5 minutes to about 60 minutes at about 200° F. to about 450° F.). The back yarn can be a textured filament or flat filament yarn or a spun yarn. The back yarn can include materials selected from natural fibers, regenerated fibers, synthetic fibers, or blends thereof. A suitable back yarn is polyester or nylon.

Figure 3:
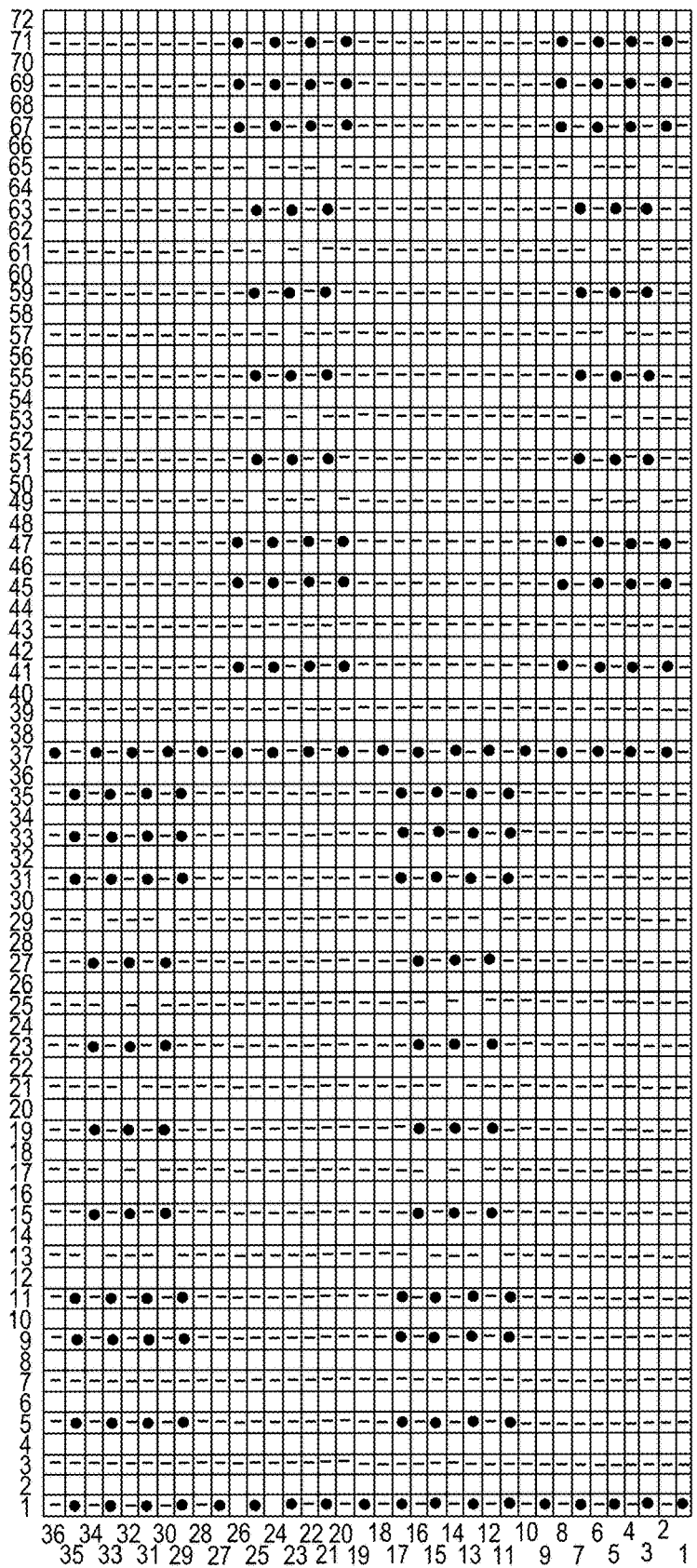
FIG. 3 is a knitting notation for forming a fabric body of a composite textile fabric.

The composite textile fabric 10 is formed by combining the face yarn and the back yarn together by knitting a plaited construction (e.g., plaited single jersey or double knit construction) such that the first fabric layer 12 and the second fabric layer 14 are distinct and separate but intimated connected together in a unitary fabric body 30 (FIG. 3). The back yarn is anchored to the face yarn by knit and/or tuck and/or welt at certain points (i.e., the anchored regions 16), while other regions of the back yarn (i.e., the floating regions 18) remain unattached to the face yarn.

The fabric body 30 can be formed on a double knit jacquard machine, or step jack double knit machine, or other patterning knitting machine. FIG. 3 is an exemplary knitting notation for a double knit jacquard machine, which can be used for producing the fabric body 30. The first fabric layer 12, in double knit, is generally knitted on the cylinder side and the second fabric layer 14 is generally knitted on the dial side. However, in some cases, the face and back yarns can be swapped.

Referring to FIG. 4, heat is thereafter applied to the fabric body 30, e.g., dry heat and/or wet heat, such as hot water or steam, e.g., during dyeing. Upon exposure to heat, the face yarn forming the first fabric layer 12 will shrink and the back yarn forming the second fabric layer will not shrink or will shrink less than the face yarn. This shrinkage causes the unattached, floating regions 18 of the back yarn to buckle outwardly, and separate further away from the first fabric layer 12 thereby providing the floating regions 18 with their "bubble" shape.

In some cases, the face yarn includes elastomeric material, such as spandex. The elastomeric material in the face yarn can help to provide for fabric stretch and enhanced user comfort. The elastomeric material may be in the form of fibers or filaments co-mingled or plated with high shrinkage fibers or filaments, or core spun in a spun yarn.

The floating regions 18 ("bubbles") can extend uniformly over the entire second fabric layer 14, or, in some cases, the floating regions 18 can have differing sizes and/or the distribution (pattern density) of the floating regions 18 can change along the second fabric layer 12. In some cases, the bubble configuration (i.e., the pattern of floating regions 18 interspersed between anchored regions 16) can be limited to discrete regions of the composite textile fabric 10, while other regions of the composite textile fabric 10 may have a plain plaited construction (i.e., no fabric bubble regions) and/or a plain plaited construction with some pattern (e.g., a jacquard pattern, but with no fabric bubbles).

Figure 5A:
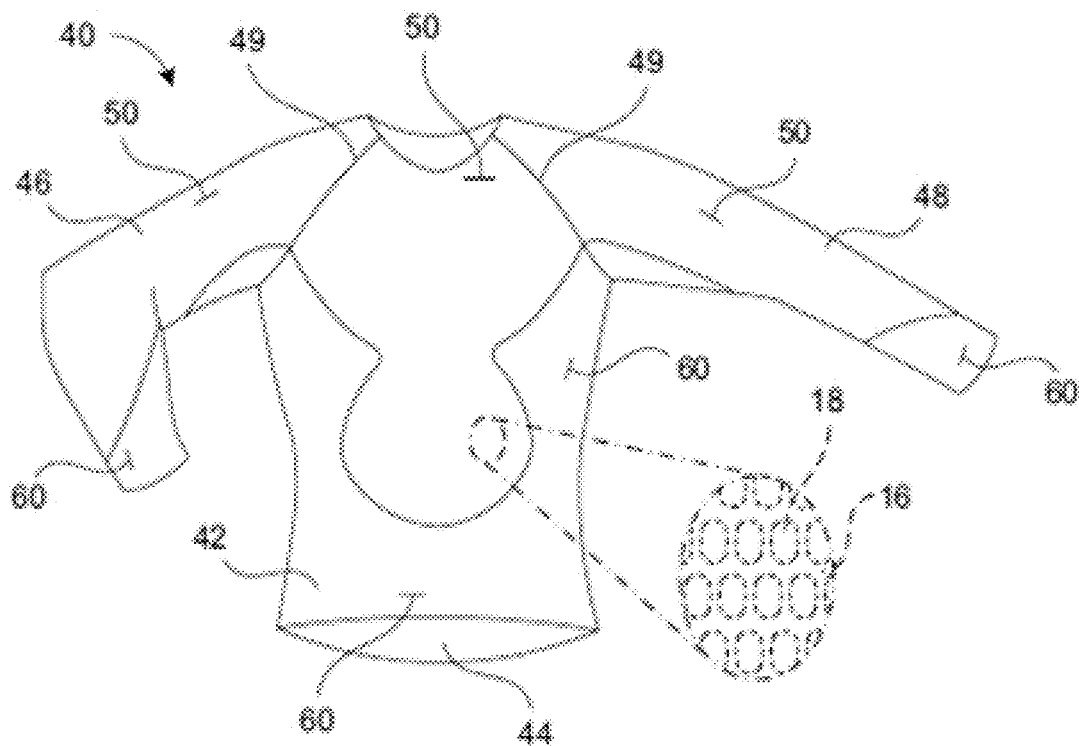
FIGS. 5A and 5B are front plan and rear plan views, respectively, of a fabric garment formed of composite textile fabric having discrete regions with a bubble configuration and other discrete regions with a plain plated construction.
Figure 5B:
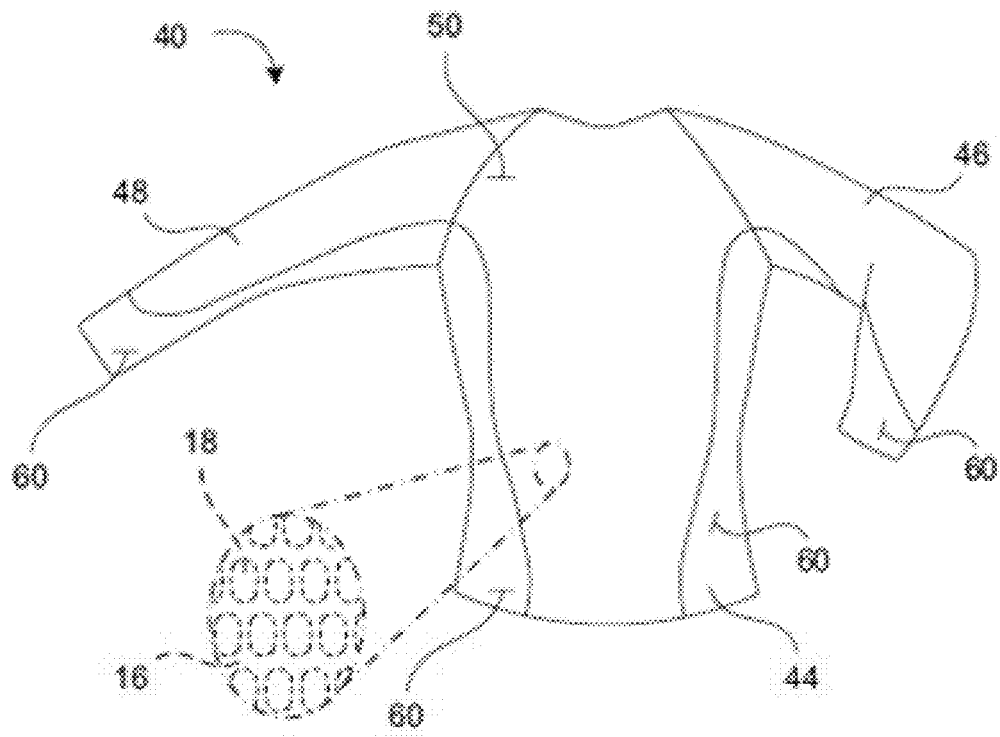

FIGS. 5A and 5B illustrate a fabric garment 40 that is formed of a composite textile fabric. The fabric garment 40 has a front element 42, a rear element 44, and arm elements 46, 48. Each of the elements consists of a composite textile fabric, such as described above with reference to FIG. 1. The elements are joined together, e.g., by stitch at seams 49. Each element defines one or more regions having a bubble configuration 50 (i.e., regions of the composite textile fabric elements that include a plurality of floating regions 18 ("bubbles") interspersed with a plurality of anchored regions 16) for enhanced air flow and liquid management, and one or more other regions 60 having plain plaited construction (i.e., no fabric bubbles). The floating regions 18 are arranged on an inner surface of the fabric garment 40 and face inwardly, towards the wearer's skin, when the fabric garment 40 is worn. The regions having bubble configuration 50 are disposed in a pattern corresponding to one or more predetermined regions of a wearer's body (e.g., regions of the wearer's body typically exposed to relatively high levels of moisture, e.g., liquid sweat) here the chest, arms, and back.

Figure 6:
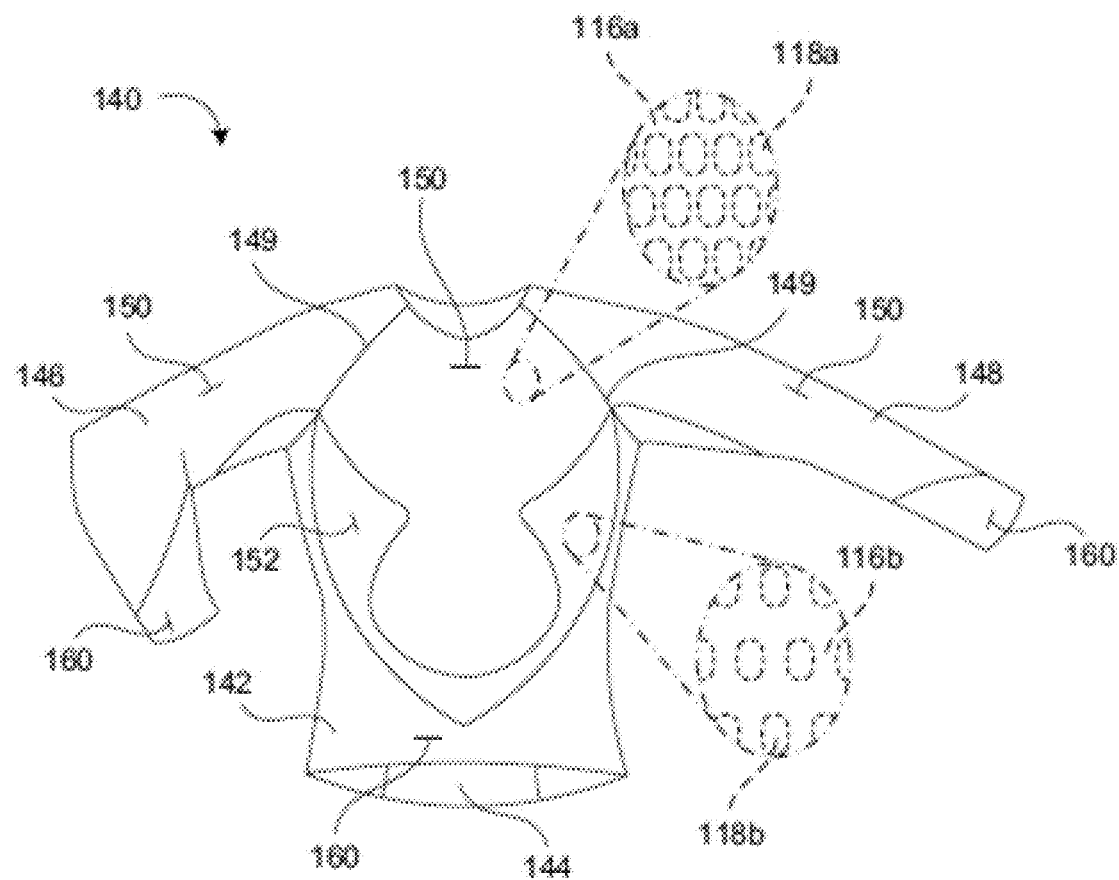
FIG. 6 is a front plan view of a fabric garment formed of composite textile fabric having regions of contrasting bubble density.

FIG. 6 illustrates another embodiment of a fabric garment 140 that is formed of a composite textile fabric. The fabric garment 140 has a front element 142, a rear element 144, and arm elements 146, 148. Each of the elements consists of a composite textile fabric, such as described above. The fabric garment 140 includes a region having a first bubble configuration 150, a region having a second bubble configuration 152, and other regions having plain plaited construction 160. The first bubble configuration 140 includes floating regions 118a interspersed between anchor regions 116a. Similarly, the second bubble configuration 152 includes floating regions 118b interspersed between anchor regions 116b. The floating regions 118a, 118b are arranged on an inner surface 141 of the fabric garment 140 and face towards the wearer's skin when then the fabric garment 140 is worn. The first bubble configuration 150 has a greater pattern density of floating regions 118a (i.e., more floating regions per square inch) than the second bubble configuration 152.

Figure 7:
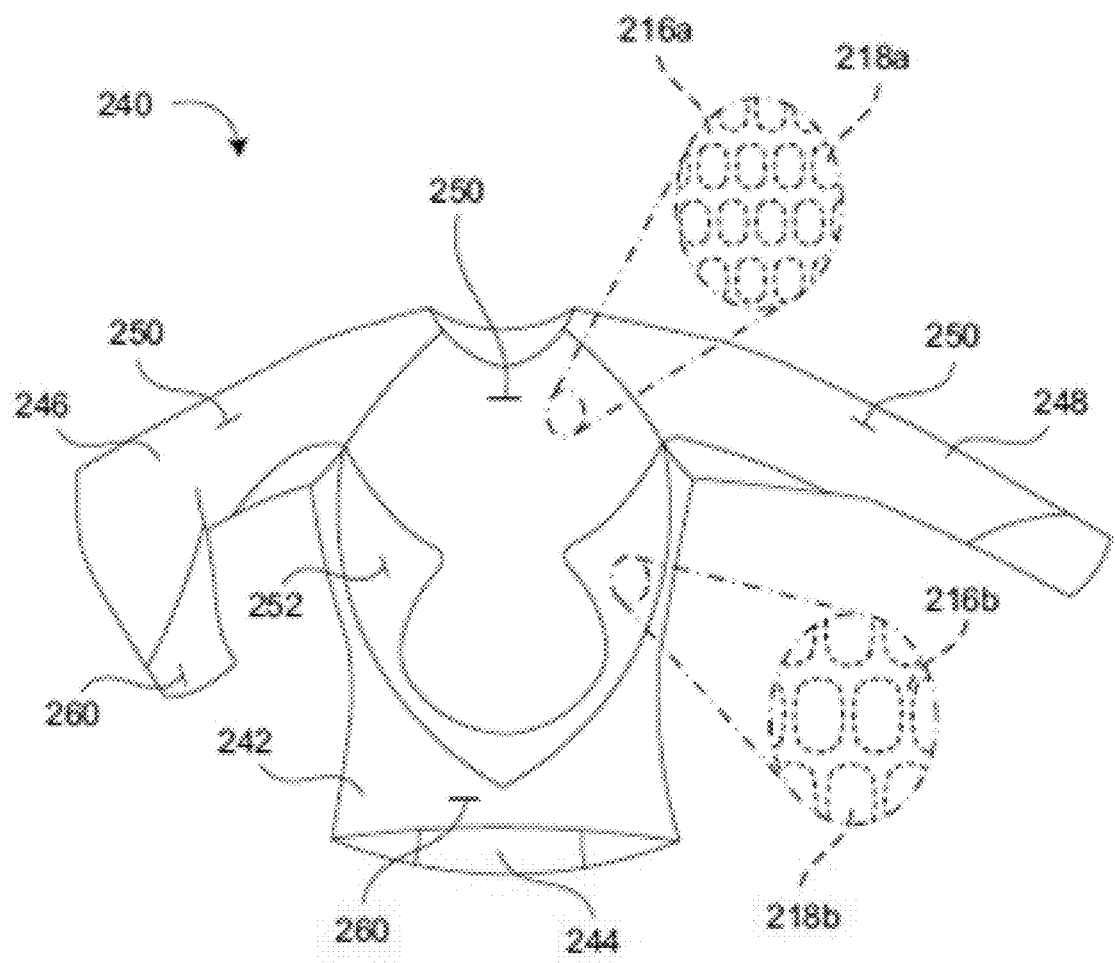
FIG. 7 is a front plan view of a fabric garment formed of composite textile fabric having regions of contrasting bubble size.

FIG. 7 illustrate yet another embodiment of a fabric garment 240 that is formed of a composite textile fabric. The fabric garment 240 has a front element 242, a rear element 244, and arm elements 246, 248. Each of the elements consists of a composite textile fabric, such as described above. The fabric garment 240 includes a region having a first bubble configuration 250, a region having a second bubble configuration 252, and other regions having plain plaited construction 260. The first bubble configuration 250 includes floating regions 218a (bubbles) interspersed between anchor regions 216a, and the second bubble configuration 252 includes floating regions 218b (bubbles) interspersed between anchor regions 216b. The floating regions 218a, 218b are arranged on an inner surface of the fabric garment 240 and face towards the wearer's skin when then the fabric garment 240 is worn. In this example, the floating regions 218a of the first bubble configuration 250 are relatively larger than floating regions 218b of the second bubble configuration 252.

While certain embodiments have been described above, other embodiments are possible.

As an example, in some embodiments, the composite textile fabric is constructed with a denier gradient. More specifically, the face yarn can have a finer denier than the back yarn. This construction promotes the movement of moisture from the coarser fiber of the back yarn, which forms the second fabric layer, toward the finer denier fiber of the first fabric layer, especially in the anchored regions where there is intimate contact between the first and second fabric layers.

In some embodiments, the denier of the face yarn of the first (outer) fabric layer is in a range of between about 50 denier and 300 denier, while the denier of the yarn of the second (inner) fabric layer is in a range of between 50 denier and 150 denier.

While embodiments have been described in which the first fabric layer is formed of yarn having high shrinkage performance which contributes to the contrasting shrinkage between the first and second fabric layers, in some embodiments, the first fabric layer may, alternatively or additionally, include spandex yarn that contributes to or causes the contrasting shrinkage between the first and second fabric layers. For example, as the fabric body is formed (e.g., in a circular knitting process) spandex yarn can be incorporated into the fabric body, as a face yarn, in a stretched state. The second fabric layer can be formed of low stretch or no stretch yarn. Once the first and second fabric layers are intimately joined (e.g., in a plaited construction), the spandex yarn is allowed to retract to its relaxed state causing the first fabric layer to contract (shrink) relative the second fabric layer. This contraction causes the unattached, floating regions of the back yarn to buckle outwardly, and separate further away from the first fabric layer thereby causing or contributing to the formation of the "bubble" shape, even without exposing it to heat. When spandex is incorporated into the first fabric layer (technical face), the differential shrinkage, as a response to heat, between the yarns of the first fabric layer and the yarns of the second fabric layer can be quite low. In some cases, for example, there by may no differential shrinkage in response to heat and the "bubble" effect can be created as a result of the contraction of the spandex yarn in the first fabric layer.

While an embodiment of a fabric garment is described above in which the garment is formed of multiple fabric elements that are joined together by stitch at seams, in some embodiments, an entire fabric garment can be formed in seamless construction.

While embodiments have been described in which the floating ("bubble") regions are arranged on an inner surface of a fabric garment, in some embodiments, the floating ("bubble") regions may instead be arranged on an outer surface of a fabric garment, facing away from a wearer's skin, to provide an aesthetic look.

In some cases, the face yarn and/or the back yarn can include flame retardant fibers.

In some embodiments, the composite textile fabric may have sweatshirt type weight, and the yarn count can be 50 to 1000 denier on either or both sides.

Other embodiments are within the scope of the following claims.

What is claimed is:

1. A method of forming a composite fabric article, the method comprising:
   knitting a plaited construction composite textile fabric comprising a first fabric layer and a second fabric layer, wherein the first fabric layer and the second fabric layer are formed concurrently, wherein the second layer comprises a plurality of anchored regions and a plurality of floating regions, wherein the plurality of floating regions are interspersed between the anchored regions, wherein in the anchored regions the first fabric layer and the second fabric layer are connected together, and wherein in the floating regions the first fabric layer and second fabric layer are unattached, wherein the first fabric layer is formed from a face yarn and the second fabric layer is formed from a back yarn, wherein the face yarn has about 10-60% shrinkage after being exposed to dry or wet heat for about 0.5-60 minutes at about 200-450° F., and wherein the back yarn has about 0-30% shrinkage after being exposed to dry or wet heat for about 0.5-60 minutes at about 200-450° F.; and, exposing the composite textile fabric to wet heat for about 0.5-60 minutes at about 200-450° F., wherein the back yarn shrinks less than the face yarn causing the floating regions of the second fabric layer to separate further from the first layer.

2. The method of claim 1, wherein the face yarn has a finer denier than the back yarn.

3. The method of claim 1, wherein the face yarn has a size range of between about 50 to 150 denier and the back yarn has a size range of between about 50 to 300 denier.

4. The method of claim 1, wherein in the anchored regions the back yarn of the second layer is anchored to the face yarn of the first layer using stitches selected from the group consisting of knit, tuck, and welt.

5. The method of claim 1, wherein the size of floating regions changes along the second fabric layer.

6. The method of claim 1, wherein a portion of the composite textile fabric comprises floating regions in the second fabric layer and a portion of the composite textile fabric comprises a plain plaited construction with no floating regions.

7. A method of forming a composite fabric article, the method comprising:

knitting a plaited construction composite textile fabric comprising a first fabric layer and a second fabric layer, wherein the first fabric layer and the second fabric layer are formed concurrently, wherein the second layer comprises a plurality of anchored regions and a plurality of floating regions, wherein the plurality of floating regions are interspersed between the anchored regions, where in the anchored regions the first fabric layer and the second fabric layer are connected together, and wherein in the floating regions the first fabric layer and second fabric layer are unattached, wherein the first fabric layer is formed from a face yarn and the second fabric layer is formed from a back yarn, wherein the face yarn has about 10-60% shrinkage after being exposed to dry or wet heat for about 0.5-60 minutes at about 200-450° F., and wherein the back yarn has about 0-30% shrinkage after being exposed to dry or wet heat for about 0.5-60 minutes at about 200-450° F.;

exposing the composite textile fabric to wet heat for about 0.5-60 minutes at about 200-450° F., wherein the back yarn shrinks less than the face yarn causing the floating regions of the second fabric layer to separate further from the first layer; and, forming the composite textile fabric into a fabric garment.

8. The method of claim 7, wherein the composite textile fabric is oriented in the garment such that the second fabric layer is positioned towards a wearer's skin.

9. The method of claim 7, wherein the size of floating regions changes along the second fabric layer.

10. The method of claim 7, wherein the size of floating regions changes along the second fabric layer.

11. The method of claim 7, wherein the fabric garment comprises a first area having a first bubble configuration with a plurality of floating regions and a second area having a second bubble configuration with a plurality of floating regions, wherein the first bubble configuration has a greater pattern density of floating regions than the second bubble configuration.

12. The method of claim 7, wherein the fabric garment comprises a first area having a first bubble configuration with a plurality of floating regions and a second area having a second bubble configuration with a plurality of floating regions, wherein the floating regions in the first bubble configuration are larger than the floating regions in the second bubble configuration.

13. The method of claim 7, wherein a portion of the composite textile fabric comprises floating regions in the second fabric layer and a portion of the composite textile fabric comprises a plain plaited construction with no floating regions.

14. The method of claim 7, wherein a portion of the fabric garment comprises a composite textile fabric having floating regions in the second fabric layer and a portion of the fabric garment comprises a plain plaited construction with no floating regions.

* * * * *